Feb. 26, 1952 — G. F. LINCKS — 2,587,341
CIRCUIT OPENING DEVICE
Filed Nov. 28, 1947 — 2 SHEETS—SHEET 1
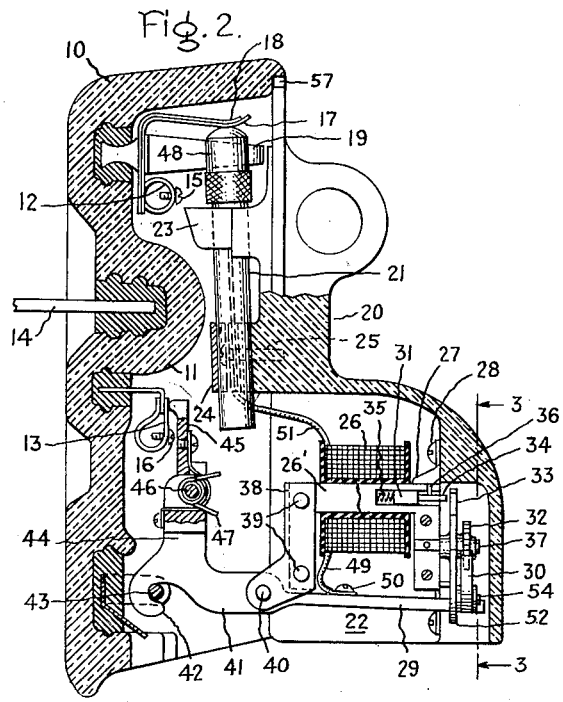
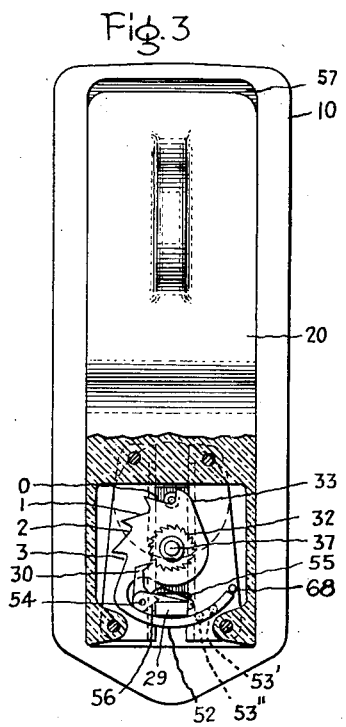
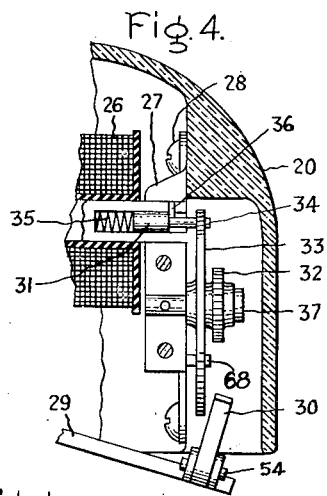
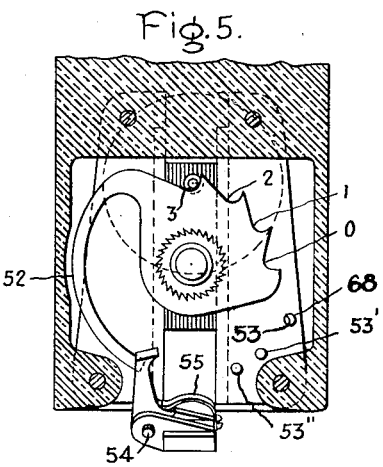
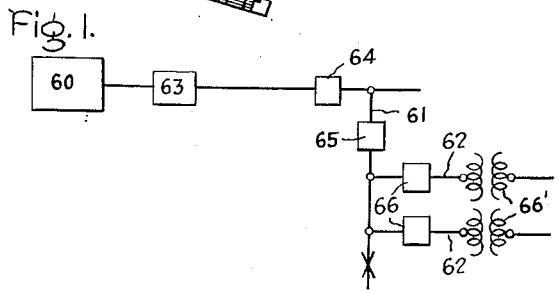
Inventor:
George F. Lincks,
by Ernest C. Britton
His Attorney.

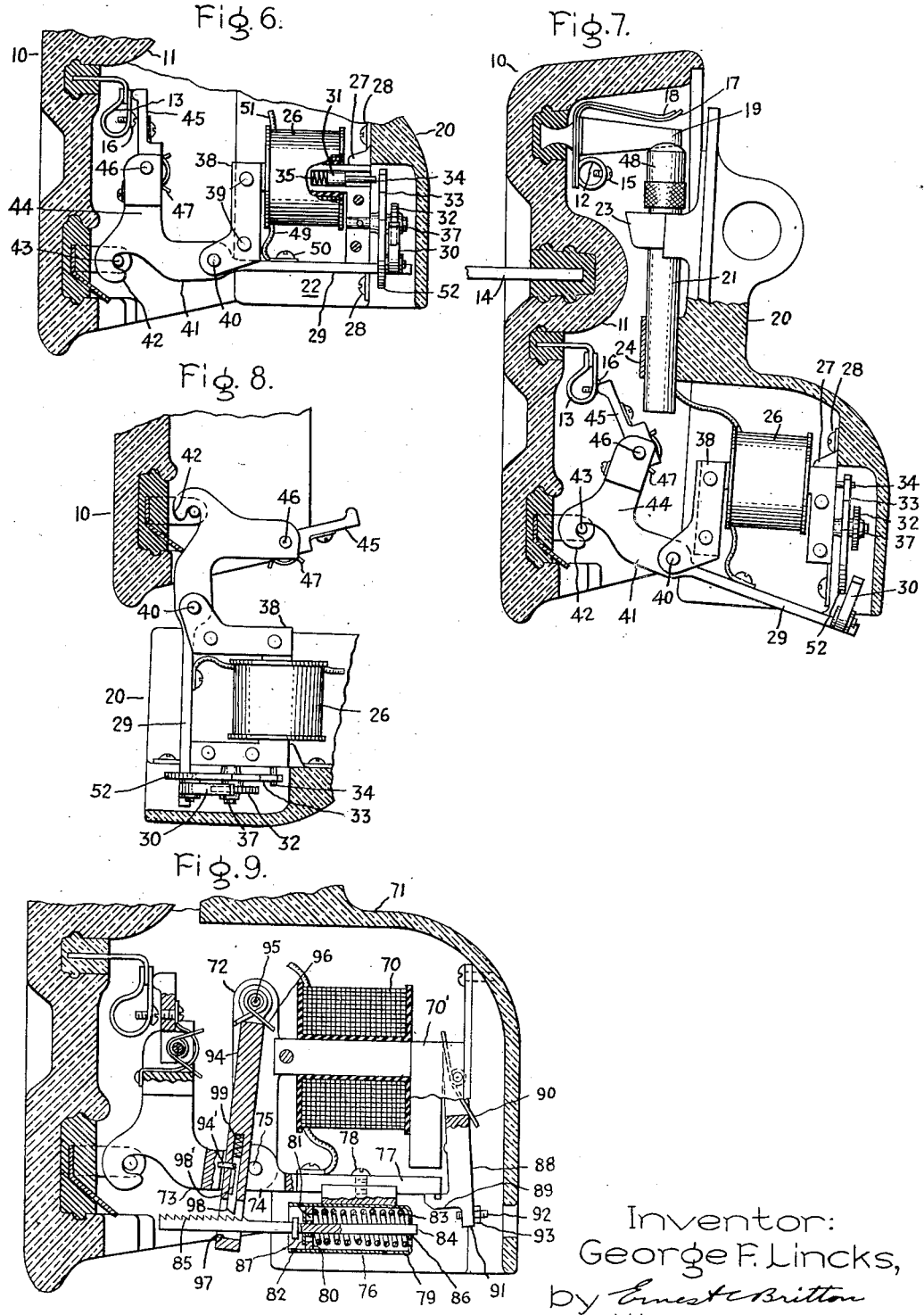

Patented Feb. 26, 1952

2,587,341

UNITED STATES PATENT OFFICE 2,587,341

CIRCUIT OPENING DEVICE

George F. Lincks, Pittsfield, Mass., assignor to General Electric Company, a corporation of New York Application November 28, 1947, Serial No. 788,567

11 Claims. (Cl. 200—108)

1

My invention relates to a new and improved fuseless circuit opening device and more particularly to an automatic circuit opening or sectionalizing device for electric power distribution systems in which my device is used in connection with an automatically operated reclosing circuit breaker.

In such distribution systems when a permanent heavy current fault or short circuit occurs on a branch circuit, it is desirable to isolate that particular branch from the system and permit service on the remainder of the system, which has been unaffected, to be continued. To partially carry out this function, sectionalizing apparatus which allows the faulty section to drop out after the feeder main has been energized by overcurrent through an automatic reclosing breaker a given number of times are currently employed by a few power companies. However, such devices are expensive and, therefore, have been employed only on a very few circuits and then only on some of the most important branches connected directly to the main feeder. Fuses, because of their low cost, are still employed on a majority of circuits in the main feeders and in branch feeders. However, the economic advantage of employing fuses for the isolation of transformers has now been eliminated by the availability of a new fuseless circuit opening device disclosed in the copending application of Lincks and Smith, Serial No. 761,893, filed July 18, 1947, now Patent No. 2,573,458, Oct. 30, 1951, and assigned to the same assignee as this application. Because of the simplicity of construction compared to prior art fuseless circuit opening devices its initial cost closely approaches that of the conventional fuse. Since a disclosed modification of this device will disconnect the circuit in which it is installed from the balance of the system after an automatic recloser breaker has interrupted and closed the circuit a predetermined number of times, several of these devices may conceivably be further modified and adjusted to open or disconnect in response to a different number of interruptions and reclosings of a recloser so that one which will open upon the first interruption of a recloser may be employed at transformer installations or in sub-branches of a given branch, one which will open upon the second interruption may be employed in a main branch feeding the sub-branches and one which will open upon the third interruption of a recloser may be employed at an advantageous point in the main feeder between the recloser and the branch feeder connection.

2

However these devices, as disclosed, are intended primarily for use at transformer installations or, in the case of the modification, in branches not having sub-branches connected thereto. The main embodiment is designed to isolate the portion of the circuit it protects during the first interruption of a recloser while the opening operation of the modification is dependent upon the duration of a fault current in the circuit for a predetermined length of time before interruption thereof by a recloser so that the device will distinguish between temporary and permanent faults which it would not be doing if it opened during the first interruption of a recloser. Nevertheless, the basic and novel principle upon which these devices operate and which has permitted their manufacture at a price close to the cost of the conventional fuse would undoubtedly tend to do likewise if employed in a sectionalizing device more suited and intended for use in main distribution feeders and in main branch feeders directly connected thereto.

It is therefore an object of my invention to provide a new and improved sectionalizer or circuit opening device which is so simple in construction compared with prior art devices that its initial cost will closely approach that of the conventional fuse and thereby permit its use where, for economic reasons only, a fuse is currently employed.

It is another object of my invention to provide a circuit opening device in which a fault current both conditions the device for operation and also holds the contacts in engagement as long as the fault current thereafter exists in the circuit.

It is still another object of my invention to provide a circuit opening device which will be conditioned for operation by a fault current but whose contacts will be held in engagement until after the fault current has been interrupted by another device connected in series relationship therewith.

It is another object of my invention to provide a circuit disconnecting device which will be responsive to successive fault current impulses above a predetermined value but will not be conditioned for or disconnect the circuit in which it is installed until after the occurrence of a predetermined number of such successive fault impulses.

It is also an object of my invention to provide a circuit opening device the operation of which will be dependent upon a predetermined number of fault current impulses but independent of the duration of such impulses.

It is a further object of my invention to provide a new and improved fuseless circuit opening device which is simple and compact and which may be used in connection with the prior art holders for fuse cutouts.

In accordance with my invention, I provide an improved circuit opening device in which the circuit completing contacts are normally held in engagement by a latching means which is released under surge conditions by a notching of ratchet mechanism upon the occurrence of a predetermined one of successive overcurrent impulses or surges through a current responsive means which then holds the contacts in engagement as long as the surge conditions exist but subsequently permits disengagement of the contacts after the surge current has been interrupted by another device in the circuit.

My invention will be better understood from the following description when taken in connection with the accompanying drawings and the scope of my invention will be pointed out in the appended claims. In the drawing Fig. 1 is a schematic diagram illustrating a small section of a distribution system employing sectionalizer opening devices of my invention; Fig. 2 is a side view, partly in section, of my improved circuit opening device in the normal closed circuit position; Fig. 3 is a sectional view taken on line 3—3 of Fig. 2; Fig. 4 is an enlarged detail view of the contact releasing and holding mechanism showing the relative position of the elements after the device has been conditioned for operation and immediately after the circuit has been interrupted by another device therein; Fig. 5 is a front view of Fig. 4 with the door broken away better to illustrate these elements; Fig. 6 is a view of the lower part of the device partly in section and partly broken away to illustrate the relative position of elements after the device has been conditioned for operation but before interruption of the circuit therethrough by another device; Fig. 7 is a side sectional view of my device showing the relative position of all the elements therein following its initial opening movement after interruption of the circuit by the other device in the system; Fig. 8 is a side sectional view of the lower portion of the device in the completed open position, and Fig. 9 is a side sectional view of the lower portion of my device illustrating a modification thereof.

Referring now to Fig. 2 of the drawing I have illustrated my invention in connection with a housing 10 of porcelain or similar insulating material of the size and shape used in connection with the fuse cutouts of the prior art, such as is disclosed, for example, in United States Letters Patent 2,081,813, assigned to the same assignee as the present application. Housing 10 may be provided with an integrally formed electric creepage and gas barrier 11 disposed between stationary line terminal contacts 12 and 13 carried by the housing. To the rear of the housing or casing 10 is secured a mounting bar 14 for the attachment of the casing to an electric line pole and cross-arm structure or the like. Conductors which are brought into the housing through holes in the housing side wall opposite each of the terminal contacts are adapted to be connected to contacts 12 and 13 by means of binding screws 15 and 16, respectively. Upper contact 12 has a contact finger 17 backed up by means of a spring strip 18 which serves to press or bias the finger 17 downwardly and has also a pair of spaced resilient contact latching fingers 19, only one of which can be seen in the drawing.

A movable door or cover 20 preferably constructed of insulating material is provided for housing 10 and suitably supports a contact support tube 21 and my circuit opening elements to be described hereinafter and generally indicated by the numeral 22. Contact support tube 21 is of insulating material and is mounted on the cover adjacent its upper end by means of projection 23 of insulating material formed integrally with the cover and provided with an opening for accommodating the tube. After mounting on the cover movement thereof is prevented by a clamp 24 partially encircling the tube and rigidly holding the lower end against the cover as indicated. The clamp 24 is maintained in the clamping position by screws 25.

The circuit opening elements of my circuit opening device, indicated generally as 22, consist of an electromagnet 26 mounted on its magnetic iron core 26' and frame 27 which is in turn rigidly mounted on cover 20 by means of screws 28, an armature 29, a pawl 30 mounted thereon, a second or plunger armature 31, a ratchet wheel 32 and combined latch and notching disk 33 integrally connected thereto. Plunger armature 31 has a detent or projection 34 thereon and a spring 35 which biases the plunger to the right so that the projection will engage notches 1, 2 or 3 in disk 33 when the electromagnet is de-energized. Further movement to the right beyond that shown in Fig. 4 is prevented by stop 36. Ratchet wheel 32 and combined latch and notching disk 33 are pivotally mounted for rotation on pin 37 which is rigidly mounted on frame 27. Two spaced support brackets 38, only one of which is shown, are rigidly attached by pins or rivets 39 or otherwise, suitably fixed to the sides of core 26'. Door 20 and the several elements thus far generally described and mounted thereon are all pivotally mounted by means of spaced brackets 38 on pivot pin 40 which is in turn mounted on lever 41 positioned between the spaced brackets. Lever 41 is of conducting material and its right-hand portion is really armature 29 which may be integrally connected thereto or, as shown, may be an integral part thereof while its left-hand portion is provided with a hook 42 which is positioned over a pivot pin 43 secured in housing 10. Thus the load of the door and elements attached thereto is transmitted to the housing. The left-hand portion of lever 41 is also provided with an upwardly extending integral arm 44 which is bifurcated at its upper end to form a fork. Lever 41, prior to the final open circuit position, is electrically connected to the lower contact terminal 13 by means of a contact finger 45 which is pivotally mounted between the forks of lever 41 at 46. Contact finger 45 is biased by spring 47 in a counterclockwise direction to provide the desired contact pressure and also to urge cover 20 and its connected parts to the open position.

Contact cap 48 is threadedly or otherwise mounted on the upper end of contact support tube 21 and when the door is closed as shown in Fig. 2, this cap passes between the resilient contact latching fingers 19 and engages contact finger 17, all of which are connected to upper contact terminal 12.

One end of the winding of electromagnet 26 is electrically connected by flexible conductor 49 to lever 41 at 50 while the other end of the winding is connected to contact cap 48 by flexible conductor 51 which passes up through the contact support tube 21 and is electrically connected by solder or other suitable means to a button head. The button head, of the type conventionally used for fuse links, is fixed in good conducting relationship between the top of the fuse tube and the contact cap when the cap has been screwed down tight on the tube threads. Thus the electromagnet is electrically connected in series relationship with terminals 12 and 13 by way of contact cap 48, conductor 51, conductor 49, lever 41, pivot pin 46, and contact finger 45.

From the description thus far and an inspection of the drawing, it will be apparent that the device as a whole, exclusive of the housing, is pivotally mounted on pin 43 and constitutes a toggle mechanism, one arm of which consists of hooked-shaped lever 41 with armature 29 integral therewith and the other arm consists of brackets 38, core 26', frame 27, door 20 and the various elements hereinbefore described and mounted either directly or indirectly thereon. Obviously, these two arms are interconnected at the knee of the toggle by the pin 40. When in the condition shown by Fig. 2, the toggle mechanism is in the rigid position with movable contact cap 48 and contact finger 45 in electrical engagement with the terminals 12 and 13, respectively. These contacts are held in engagement and the toggle maintained in rigid position by latch arm 52 which is an integral part of combined latch and notching disk 33 which is biased by a spring or any other suitable means in a counterclockwise direction, as viewed in Fig. 3, to the holding position. Latch arm 52 is in the shape of the segment of a circle projecting from the disk 33 and physically so connected thereto that a spaced slot, open at one end, is formed therebetween through which the end of armature 29 projects. Under normal current conditions part of the biasing forces tending to disengage the contacts are transmitted directly to latch 52 from armature 29 which rests thereon as more clearly indicated in Fig. 3. Further rotation of disk 33 in a counterclockwise direction beyond the position shown in Fig. 3 is prevented by engagement of the end or tail of latch 52 with removable pin or screw 68 mounted in a tapered or threaded hole 53 either on the frame 27 or on the door 20. Stop 68 may be moved to alternative holes or positions 53' or 53" as a means of adjusting the position of the disk 33 and controlling the positioning of the notches therein with respect to the projection 34 on the armature 31 so as to predetermine the number of successive current surges required to cause my device to drop open. Pawl 30 pivotally mounted by pin 54 on the end of armature 29 is biased by spring 55 in a clockwise direction for engagement with the teeth of ratchet wheel 32 but clockwise rotation beyond the position illustrated in Fig. 3 is prevented by engagement of boss 56 thereon with the armature 29. It should be observed that under normal current conditions as illustrated by Figures 2 and 3, armature 29 is unattracted by core 26' of electromagnet 26 and pawl 30 is clear of or out of engagement with the teeth of ratchet wheel 32 as more clearly shown in Fig. 3. It should also be observed that under normal current conditions plunger armature 31 although biased by spring 35 toward the right and stop 36 is attracted toward the left against the bias and away from stop 36.

Referring now to Fig. 1, I have schematically illustrated in a one-line diagram a portion of a power distribution system comprising a substation 60 supplying current to a main branch 61 and a plurality of sub-branches 62 through a conventional automatic reclosing circuit breaker or multi-shot fuse cutout 63 located in the main circuit near the substation and through my sectionalizer devices 64 also located in the main circuit at an advantageous point between recloser 63 and the point of the connection of the main branch to the main circuit 65 located in the main branch close to the main circuit and 66 located in each of the sub-branches feeding transformers 66'.

Although my device may be designed to isolate the circuit in which it is installed upon the interruption of the circuit subsequent to any prior number of interruptions of a recloser, let it be assumed that the circuit opening devices in Fig. 1 are so coordinated with recloser 63 that 66 will open on the first interruption by the recloser as secured by positioning pin 68 in position 53", 65 will open on the second interruption as secured by positioning pin 68 in position 53', and 64 will open on the third interruption as secured by positioning pin 68 in position 53. Positioning of pin 68 in positions 53, 53' or 53", respectively, locates notches 0, 1 or 2 on disk 33 to coincide with projection 34 on armature 31. The description of operation hereinafter will be primarily related to device 65 which, it has been assumed, opens on the second interruption.

Under normal current conditions, the door 20, the tube 21 and the circuit opening elements 22 which are all pivotally mounted on pin 43 for movement into and out of electrical conducting relation with terminal 12 and 13 will be held as illustrated in Fig. 2 so the contact cap 48 is in contact with terminal contact 17 and thus with terminal 12 by latch arm 52 under armature 29. Under these conditions, as previously pointed out, plunger armature 31 will also be attracted to the left against its spring bias tending to force it to the right. Upon the occurrence of a fault, for example X on the main branch 61, above a predetermined value concerning which circuit opening devices 64, 65, and recloser 63 are designed to be responsive, the electromagnet 26 in my circuit opening device 65 will be sufficiently energized to attract armature 29 to the uppermost position of its travel as shown in Fig. 6. Actually this upward movement is a slight counterclockwise motion of the armature and lever 41 integral therewith about pin 43 which is permitted by the gap 57 between the top of the door and the housing. Pawl 30 mounted on the armature will also be raised by the upward movement thereof so as to engage the teeth of the ratchet wheel 32 and rotate the wheel and notched disk 33 integral therewith in a clockwise direction against their bias. The spacing of the notches 0, 1, 2 and 3 in disk 33 are so related to the upward travel of armature 29 that notch number 2 will be aligned with the plunger armature 31 by this initial movement. Promptly following this first surge of current above a predetermined value, automatic recloser 63 will interrupt the circuit and since electromagnet 26 will thereby be deenergized armature 29 will drop. However dropping of the armature to a position beyond that illustrated in Figures 2 and 3 will be arrested by latch 52 which is still in a position thereunder. Moreover, since interruption of the circuit has de-energized the magnet 26, armature 31 is no longer attracted to the left but has moved to the right under its spring bias to a position similar to that illustrated in Fig. 4, so that its projection 34 is in engagement with notch number 2 in the notched disk 33. The disk is thus prevented from rotating counterclockwise under its spring bias to its initial and normal set position as long as the circuit is deenergized. Thereafter recloser 63 closes the circuit and if the fault X is still thereon, armature 29 in opening devices 64 and 65 will again be attracted and since plunger armature 31 is obviously responsive to all currents above a normal value as well as to those of normal value it will simultaneously be attracted so as to disengage the notched disk. As a matter of design or adjustment, however, the strength of the spring or the force of the biasing means which biases disk 33 for rotation to its normal set position is so selected that the resulting friction between the notch in the disk and projection 34 of armature 31 will cause sufficient drag to prevent projection 34 from disengaging the notched disk until the pawl 30 mounted on the rising armature has engaged the teeth of the ratchet wheel 32 whereupon this drag will be eliminated and continued upward travel of armature 29 and pawl 30 will cause further clockwise rotation of the ratchet wheel and disk as hereinbefore described. Notched disk 33 will thereby be so positioned that upon a second interruption of the circuit by recloser 63 the return rotation of the disk to its initial set position will be prevented by engagement of the projector on armature 31 with notch number 3 of the disk in the manner described above. In this way, the disk will have been advanced in a step-by-step manner by successive surges or currents above a predetermined value until, upon the occurrence of the second surge impulse, notch number 3 will be aligned with the plunger armature and holding latch arm 52 will be in the position indicated in Fig. 5 so that free dropping of armature 29 is no longer prevented. However the toggle mechanism is nevertheless prevented from collapsing and the contacts are held in engagement by the continued attraction of the armature to its uppermost position indicated in Fig. 6 until such time as the recloser again interrupts the circuit. When this occurs holding latch arm 52 will be maintained in the position indicated in Fig. 5 by engagement of the projection 34 on armature 31 with notch number 3 in the disk so that armature 29 will drop free as shown by Figures 4, 5 and 7 for clockwise rotation about pin 43 and collapse of the toggle mechanism, as more clearly shown by Fig. 7, and finally disengagement of the contacts and opening of the door as illustrated in Fig. 8. In short, my device is provided with a counting mechanism which automatically counts or adds up a predetermined number of successive overcurrent impulses and then conditions itself for operation upon the occurrence of the last predetermined impulse and finally operates to disconnect the circuit in which it is installed from the rest of the distribution system upon the interruption of the circuit subsequent to the last impulse.

Upon the occurrence of the several operations by circuit opening device 65 hereinbefore described, similar operations have simultaneously occurred in my circuit opening device 64 with the exception of the final release of the armature therein and disengagement of its contacts. These latter operations have been prevented by the fact that pin 68 was in position 53 and notch 0 in notch disk 33 of device 64 coincided with projection 34 of armature 31 so that, upon the occurrence of the second impulse surge which conditioned device 65 for disengagement of its contacts, the tail or end of holding latch 52 is still under armature 29 in device 64. Therefore upon the occurrence of a subsequent, in this case the second, interruption of the circuit by recloser 63 which permitted disengagement of the contacts in device 65, the contacts in device 64 will be held in engagement by latch 52 which will be maintained in the position to which it has been rotated by engagement of projection 34 of armature 31 with notch number 2 therein.

Thus, the fault X and the branch main 61 will be isolated by device 65 during the momentary period recloser 63 is open subsequent to its second interruption and service will be restored on the remainder of the system following the next reclosing of recloser 63 since in the absence of a surge above a predetermined value and return of normal current conditions in the magnet of device 64, armature 29 therein will drop so that pawl 30 will be free of the teeth in ratchet wheel 32, plunger armature 31 will be attracted by the normal current so that the projection thereon will disengage notch number 2 and the notched disk 33 will be free to rotate counterclockwise under its bias to the initial normal set position as shown in Figures 2 and 3.

Following the removal of fault X in the main branch 61, the linesman need replace no parts in the device 65, and thus has no choice of a rating such as he would have in replacing a blown fuse link in a fuse cutout. All that is necessary to renew service to the main branch is to re-engage latch 52 under armature 29 and re-engage the contacts by pivoting door 20 and its associated parts about pin 43 to the closed position.

In addition to the engagement of latch 52 with armature 29, the contacts are held in engagement and the door 20 is maintained closed, during normal circuit conditions, by the engagement of the contact cap 48 with the pair of latching fingers 19.

Instead of a fault on branch circuit 61, it should now be apparent that in the event of a fault above a predetermined value on one of the sub-branches 62, the contacts in circuit opening device 66 therein will be conditioned for disengagement upon the occurrence of the first surge and will finally become disengaged upon the subsequent or first interruption by recloser 63 so that this particular sub-branch will be disconnected or isolated from the system while normal service will be resumed on the balance of the main branch through device 65 in which the contacts will not have become disengaged prior to two interruptions as described above.

In Fig. 9 I have illustrated a modification of my device in which a toggle mechanism and a ratchet or counting mechanism for release of a contact-holding means is provided but a separate holding means and a second armature for actuation of the ratchet mechanism are also employed. Electromagnet 70 with its magnetic iron core 70' is mounted on door 71 and a pair of spaced brackets 72, only one of which is shown in the drawing, are suitably fixed to the core thereof as in the main embodiment. However, lever 73, comparable to lever 41 in the main embodiment, is provided with a slot 74 therein and brackets 72 are pivotally mounted on the side walls of the slot by separate pins 75 only one of which is shown. A dashpot time delay means 76 is mounted on the right-hand extension of lever 73, which is actually an armature 77, by means of screws 78. Dashpot 76, which is illustrated as an air type but might readily be constructed as an oil type, is comprised of a cylinder 79, a piston 80 with apertures 81 therein, a disk valve 82 with an opening or openings therein having a smaller total area than the openings in piston 80 and a spring 83 tending to bias piston 80 toward the left-hand end of the cylinder. Piston 80 is fixedly mounted on a piston rod 84, the left-hand end of which is provided with ratchet teeth 85 and the right-hand end of which projects through an opening 86 in the head of cylinder 79. The size of opening 86 is sufficiently in excess of the size of piston rod 84 so as to permit slidable movement of the rod therethrough. Disk valve 82 is slidably mounted on piston rod 84 for free movement between piston 80 and a fixed collar 87 on the piston rod. Armature 77 is held in the position indicated in Fig. 9 and the contacts, arranged exactly as the contacts are arranged in the main embodiment, are held in engagement by a separate holding latch 88 which is provided with a lip 89 to support the armature as shown. Latch 88 is normally biased in a clockwise direction, to the holding position indicated by spring bias 90 and is provided with a downwardly extending arm 91. Arm 91 is provided with a tapped opening to threadedly accommodate a threaded rod 92 which is maintained in a predetermined position after having been screwed into the opening by lock nut 93. The second armature 94 is pivotally mounted on pin 95 between brackets 72 and is normally biased in a clockwise direction by spring 96 against the left-hand end wall of slot 74. Armature 94 extends or projects through the slot 74 in lever 73 and is in turn provided with a slot 97 through which the left-hand end of piston rod 84 projects. In the lower end of armature 94 is provided a plunger type pawl 98 having a flattened side coinciding with a flat side of a hole in armature 94 to hold pawl 98 from rotating. Pawl 98 is biased downward by coil spring 99 for engagement with the ratchet teeth 85 on the piston rod 84. Further downward motion of pawl 98 beyond that indicated in the figure is limited by engagement of a stop or pin 94' fixed to armature 94 with the upper wall of a slot 98' in pawl 98. The end of pawl 98 is beveled and the bevel is positioned so the pointed end engages the teeth 85 on the piston rod 84 when armature 94 moves to the right, and so the bevel slides over the teeth 85 without engaging them when armature 94 moves to the left.

Upon the occurrence of a current through magnet 70 above a predetermined value armature 77 will be attracted upward as in the main embodiment and the dashpot 76 attached thereto will also be elevated so that the right-hand end of piston rod 84 will be aligned with rod 92 and the pointed end of pawl 98 is forced into pressurized engagement with teeth 85 of the piston rod 84, compressing spring 99. The overcurrent surge which has attracted armature 77 simultaneously attracts armature 94 which rotates counterclockwise against its spring bias and thereby permits the engagement of pawl 98 with ratchet teeth 85 to move piston rod 84 toward the right against spring bias 83 within the cylinder. Dashpot 76 may contain a liquid or, as illustrated, merely air. In either case, the air or liquid entrapped in the cylinder to the right of the piston will flow freely, during the movement of the piston toward the right, through the large openings therein and also hold valve disk 82 against collar 87. If the device has been adjusted so as not to disengage its contacts during the first interruption of an automatic recloser connected in series therewith, this initial current surge will not bring the right-hand end of piston rod 84 into engagement with adjustable rod 92. Then when the recloser interrupts the circuit, armature 77 will drop quickly to rest on lip 89 of the holding means and thereby remove the pressurized relation of the beveled end of pawl 98 with the teeth 85 of the piston rod 84. Armature 94 will quickly rotate clockwise under its spring bias with the beveled end of pawl 98 sliding rapidly over the ratchet teeth 85 to the position indicated in the figure. However, initial movement of piston rod 84 and piston 80 toward the left under their spring bias 83 will move valve disk 82 to the right over the openings on piston 80 so that leftward motion thereafter will be retarded or relatively slow as allowed by passage of air or liquid to the right side of the piston through the limiting small opening in the disk valve. The return travel speed of piston 84 is so coordinated with the period between the interruption and subsequent reclosing of a recloser that the piston will not travel as far to the left during this period as it was previously moved to the right by armature 94. Therefore, if the fault is still on the circuit the next reclosing of the recloser will again energize magnet 70 with an overcurrent which will again raise armature 77, attract armature 94 and thereby move the right-hand end of piston rod 84 closer to adjustable rod 92 than it was moved by the prior surge impulse. Thus, successive overcurrent impulses will move the end of piston rod 84 in a step-by-step manner further to the right until eventually, depending upon how far adjustable rod 92 has been screwed toward the left in the tapped opening in latch 88, an impulse will bring the end of the piston rod into engagement with rod 92 and move latch 88 counterclockwise against its bias so that supporting lip 89 will no longer be under armature 77. Then upon the next interruption of the circuit by the recloser, armature 77 will drop free permitting collapse of the toggle mechanism, disengagement of the contacts and opening of the door in the manner described in connection with the main embodiment. It should be apparent that this modification may be employed to disconnect its contacts upon the first or second, or third, etc., interruption of the circuit by a recloser merely by varying the adjustment or position of rod 92.

Thus, I have provided new and improved automatic fuseless circuit opening devices which automatically isolate faults to the smallest portion of the line and it should be observed that these devices only open during the period when the reclosing circuit interrupter is open in response to all fault currents which can cause the recloser to function. It should also be observed that my devices are conditioned for operation by a surge current before the reclosing circuit interrupter opens the circuit and before the holding means therein is released prior to the final interruption which permits actual disengagement of the contacts.

Obviously, my device will cooperate equally as well with a multi-shot fuse cutout as with an automatic recloser or with any other circuit breaking device providing similar operating characteristics.

While I have, in accordance with the patent statutes, shown and described a particular embodiment of my invention and a modification thereof mounted on a cover for use with prior art fuse cutout housings, I do not desire my invention to be limited to the construction shown and described for it will, of course, be evident to those skilled in the art that changes and modifications may be made without departing from my invention. For example, any electro-responsive means other than a magnet and various arrangements of latches and levers may be utilized. Furthermore, well known prior art counting mechanism other than those disclosed and well known prior art actuating mechanism other than a ratchet and pawl may be employed. Other prior art time delay means such as the well known escapement mechanism may also be used in both the device of the modification and in the main embodiment as well. Moreover, these elements may be mounted for use with prior art open type fuse cutout supports as well as with prior art enclosing fuse housings. I, therefore, aim in the appended claims to cover all such changes and modifications as fall within the true spirit and scope of my invention.

What I claim as new and desire to secure by Letters Patent of the United States is:

1. A circuit opening device comprising a stationary support, a contact mounted on said stationary support, a movable support, a second contact engageable with said first mentioned contact mounted on said movable support and movable therewith, means biasing said second contact out of engagement with the other contact, means holding said contacts in engagement against the bias of said biasing means, a ratchet mechanism for releasing said holding means, means responsive to successive current impulses through said contacts above a predetermined value to advance said ratchet mechanism in a step-by-step manner from an initial normal set position to a final releasing position, an armature detent means biased to engage and maintain said ratchet as advanced between said successive current impulses and responsive to normal current through said contacts for releasing said ratchet mechanism for return to said initial normal set position.

2. A circuit opening device comprising a stationary support, a contact mounted on said stationary support, a second contact engageable with said first mentioned contact mounted on said movable support and movable therewith means biasing said second contact out of engagement with the other contact, means holding said contacts in engagement against the bias of said biasing means including a rotatably mounted ratchet wheel and notched disk integral therewith biased to the holding position, an electromagnet having a winding connected in series relationship with said contacts, an armature for said electromagnet operative to the attracted position in response to current impulses through said contacts exceeding a predetermined value, a pawl mounted on said armature and engageable with said ratchet wheel whereby said armature is operative in response to successive current impulses above said predetermined value to rotate said ratchet wheel and said notched disk in a step-by-step manner from an initial set position so as to release said holding means during the occurrence of a predetermined one of said successive impulses and thereafter hold said contacts in engagement until the current therethrough subsequently decreases below a predetermined value, a plunger armature for said electromagnet operative by a biasing means for engagement with the notches in said disk when current through contacts is below a normal value and operative against said bias for disengagement from said notches when said current equals or exceeds said normal value whereby return rotation of said disk by its biasing means prior to the occurrence of said predetermined one of said current impulses and subsequent to the occurrence of a current impulse above said predetermined value is prevented by engagement of said plunger with a notch in said disk as long as current through said contacts is below a normal value while return rotation of said disk to an initial set position is permitted by disengagement of said plunger from said notch upon the occurrence of normal current through said contacts.

3. A circuit opening device comprising a pair of cooperating contacts, means biasing one of said contacts out of engagement with the other contact in each of two paths, an electromagnet having a winding connected in series relationship with said contacts, an armature for said electromagnet operative to the attracted position in response to a current impulse exceeding a predetermined value, holding means movable into a position for engagement with said armature to normally hold said contacts in engagement against the bias of said biasing means and including a rotatably mounted ratchet wheel biased to the holding position to normally prevent movement of said one contact in one of said paths, a pawl mounted on said armature and engageable with said ratchet wheel, said armature operative in response to successive current impulses above said predetermined value to move said pawl and rotate said ratchet wheel in a step-by-step manner to move said holding means out of said engageable holding position during the occurrence of a predetermined one of said successive impulses and to thereafter hold said contacts in engagement solely by magnetic attractive force independent of said holding means until the current through said contacts subsequently decreases below a predetermined value.

4. A circuit opening device comprising a stationary support, a contact mounted on said stationary support, a movable support including a magnetic member pivotally connected with and movable relative to said support, a contact mounted on said movable support and movable therewith, holding means movable into a position for engagement with said magnetic member whereby said contacts are normally held in engagement, means biasing said contacts out of engagement, means operable in response to current through said contacts exceeding a predetermined value to move said engageable holding means out of said holding position for engagement with said magnetic member, said current responsive means including said magnetic member operative independent of said holding means to maintain said contacts in engagement solely by magnetic attractive force against the bias of said contact biasing means until the current through said contacts subsequently decreases below a predetermined value.

5. A circuit opening device comprising a movable support including a magnetic member, a pair of cooperating contacts, one of said contacts being mounted on said support for movement in two paths, means biasing said one contact out of engagement with the other contact in each of said paths, means holding said contacts in engagement against the bias of said biasing means, a ratchet mechanism for releasing said holding means to permit movement of said one contact in one of said paths, means responsive to a current through said contacts above a predetermined value to actuate said ratchet mechanism to effect said release of said holding means when said current is above said predetermined value and to cause movement of said magnetic member to an attracted position, said magnetic member when in said attracted position being independent of said holding means and effective to hold said contacts in engagement solely by magnetic attractive force until said current falls below a predetermined value.

6. A circuit opening device comprising a movable support including a magnetic member, a pair of cooperating contacts, one of said contacts being mounted on said support for movement in two paths, means biasing said one contact out of engagement with the other contact in each of said paths, means holding said contacts in engagement against the bias of said biasing means, a ratchet mechanism for releasing said holding means to permit movement of said one contact in one of said paths, means responsive to a current through said contacts above a predetermined value to actuate said ratchet mechanism to effect said release of said holding means and to cause movement of said magnetic member to an attracted position, said magnetic member when in said attracted position being independent of said holding means and effective to hold said contacts in engagement solely by magnetic attractive force until said current falls below a predetermined value.

7. A circuit opening device comprising a movable support including an armature, a pair of cooperating contacts, one of said contacts being mounted on said support for movement in two paths, means biasing said one contact out of engagement with the other contact in each of said paths, means holding said contacts in engagement against the bias of said biasing means, a ratchet mechanism for releasing said holding means to allow movement of said one contact in one of said paths, an electromagnet responsive to currents through said contacts above a predetermined value to actuate said ratchet mechanism to effect said release of said holding means and to cause movement of said armature to an attracted position, said armature when in said attracted position being independent of said holding means and effective to hold said contacts in engagement solely by magnetic attractive force until said current falls below a predetermined value.

8. A circuit opening device comprising a movable support including a magnetic member, a pair of cooperating contacts, one of said contacts being mounted on said support for movement in two paths, means biasing said one contact out of engagement with the other contact in each of said paths, means holding said contacts in engagement against the bias of said biasing means, a movable ratchet mechanism for releasing said holding means to permit movement of said one contact in one of said paths, said ratchet mechanism being biased to the holding position, means responsive to successive current impulses through said contacts in excess of a predetermined value to move said ratchet mechanism in a step-by-step manner from an initial set position to release said holding means during the occurrence of a predetermined one of said successive impulses and to cause movement of said magnetic member to an attracted position, said magnetic member when in said attracted position being independent of said holding means and effective to hold said contacts in engagement solely by magnetic attractive force until the current therethrough subsequently decreases below a predetermined value.

9. A circuit opening device comprising a movable support including a magnetic member, a pair of cooperating contacts, one of said contacts being mounted on said support for movement in two paths, means biasing said one contact out of engagement with the other contact in each of said paths, means holding said contacts in engagement against the bias of said biasing means, a ratchet mechanism responsive to successive current impulses through said contacts above a predetermined value for counting said impulses and releasing said holding means while said current is above said predetermined value to permit movement of said one contact in one of said paths, said magnetic member being movable to an attracted position in response to current above said predetermined value and effective when in said position to hold said contacts in engagement solely by magnetic attractive force independent of said holding means until said current falls below a predetermined value.

10. A circuit opening device comprising a movable support including a magnetic member, a pair of cooperating contacts, one of said contacts being mounted on said support for movement in two paths, means biasing said one contact out of engagement with the other contact in each of said paths, means holding said contacts in engagement against the bias of said biasing means including a movable ratchet mechanism biased to the holding position to normally prevent movement of said one contact in one of said paths, means responsive to successive current impulses through said contacts in excess of a predetermined value to move said ratchet mechanism in a step-by-step manner from an initial set position to release said holding means during the occurrence of a predetermined one of said successive impulses, said magnetic member being movable to an attracted position in response to current above said predetermined value and effective when in said position to hold said contacts in engagement solely by magnetic attractive force independent of said holding means until the current through said contacts subsequently decreases below a predetermined value.

11. A circuit opening device comprising a movable support including an armature, a pair of cooperating contacts, one of said contacts being mounted on said movable support and movable therewith, means biasing said one contact out of engagement with the other contact, releasable holding means movable into a position for engagement with said armature to normally hold said contacts in engagement against the bias of said biasing means, a ratchet mechanism for releasing said holding means comprising a second armature and a movable piston rod having ratchet teeth adjacent one end thereof, the opposite end of said piston rod being engageable with said holding means, said second armature being pivotally mounted adjacent one end thereof and having a pawl engageable with said ratchet teeth adjacent the opposite end thereof, said second armature being responsive to current impulses above a predetermined value to cause engagement of said opposite end of said piston rod with said holding means and effect release thereof, said first mentioned armature being movable to an attracted position in response to said current impulses above a predetermined value and effective when in said position to hold said contacts in engagement solely by magnetic attractive force independent of said holding means until said current falls below a predetermined value.

GEORGE F. LINCKS.

REFERENCES CITED

The following references are of record in the file of this patent:

UNITED STATES PATENTS

| Number | Name | Date |
| --- | --- | --- |
| 1,982,986 | Garlington | Dec. 4, 1934 |
| 2,253,400 | Shoemaker | Aug. 19, 1941 |
| 2,334,339 | Lemmon | Nov. 16, 1943 |
| 2,379,729 | Lincks | July 3, 1945 |
| 2,452,233 | Gerard et al. | Oct. 26, 1948 |
| 2,523,984 | Edwards | Sept. 26, 1950 |